United States Patent [19]

Umeya et al.

[11] Patent Number: 4,623,586

[45] Date of Patent: Nov. 18, 1986

[54] VIBRATION DAMPING MATERIAL OF POLYMER BASE CONTAINING FLAKE FILLER

[75] Inventors: Kaoru Umeya, Sendai; Michiharu Mishima, Matsuzaka; Yoshihiro Sugata, Sendai, all of Japan

[73] Assignee: Central Glass Company, Limited, Ube, Japan

[21] Appl. No.: 798,362

[22] Filed: Nov. 18, 1985

Related U.S. Application Data

[63] Continuation of Ser. No. 541,411, Oct. 13, 1983, abandoned.

[30] Foreign Application Priority Data

Oct. 15, 1982 [JP] Japan .................................. 57-181075

[51] Int. Cl.$^4$ ......................... B32B 27/00; B32B 19/00
[52] U.S. Cl. .................................... 428/324; 252/62; 428/323; 428/325; 428/328; 428/357; 524/493; 524/494; 524/495
[58] Field of Search ............... 428/323, 324, 325, 328; 252/62

[56] References Cited

U.S. PATENT DOCUMENTS

| | | | |
|---|---|---|---|
| 3,994,845 | 11/1976 | Blachford | 524/449 |
| 4,276,385 | 6/1981 | Tenhagen | 521/112 |
| 4,385,139 | 5/1983 | Küchler | 523/437 |
| 4,451,605 | 5/1984 | Theodore | 524/423 |
| 4,555,533 | 11/1985 | Ambros | 523/440 |

*Primary Examiner*—Christopher A. Henderson
*Attorney, Agent, or Firm*—Schwartz, Jeffery, Schwaab, Mack, Blumenthal & Evans

[57] ABSTRACT

A vibration damping material which is a composite material comprising an organic polymer as matrix and a flake filler dispersed in the polymer matrix. The orientation of the filler flakes is controlled such that the major surfaces of the individual flakes are at an angle of $0°\pm30°$ with a predetermined plane. The vibration damping material is used to form a damping layer on a surface of the object of vibration damping. In the case of vibration damping of the extensional type using only the damping layer, the aforementioned plane is parallel to the major surfaces of the damping layer. In the case of providing a constraining layer on the damping layer the aforementioned plane is normal to the major surfaces of the damping layer. The flake filler is usually an inorganic material and may be coated with an organic polymer. This vibration damping material features large values of loss modulus when used in the extensional manner and large values of dynamic loss factor when used in the constrained manner over wide ranges of temperature and frequency.

15 Claims, 10 Drawing Figures

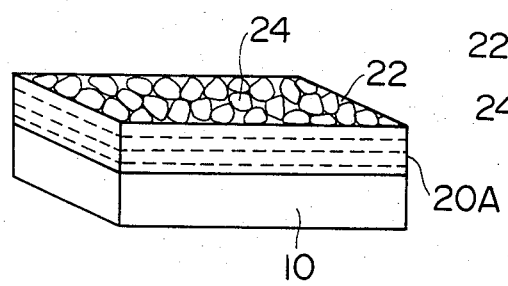
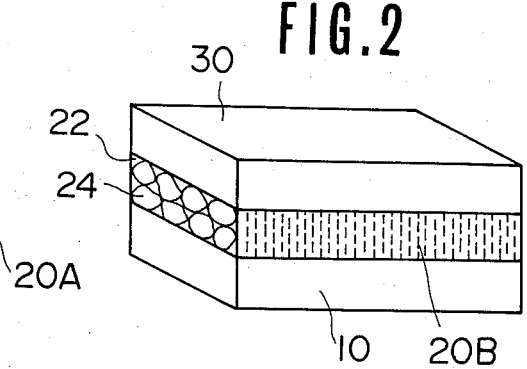
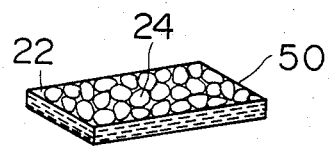
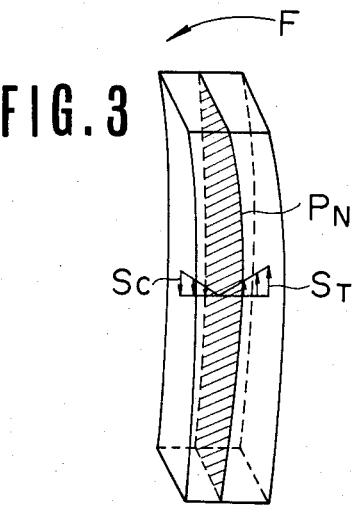
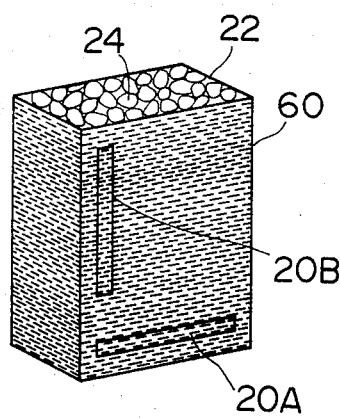
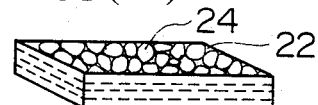
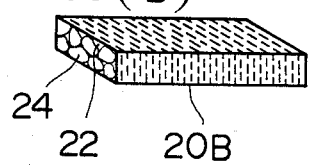

VIBRATION DAMPING MATERIAL OF POLYMER BASE CONTAINING FLAKE FILLER

This application is a continuation of application Ser. No. 541,411 filed 10-13-83 now abandoned.

BACKGROUND OF THE INVENTION

This invention relates to a vibration damping material for application to the surfaces of vibratory structures, the vibration damping material being of the type containing a flake filler dispersed in a polymer matrix.

With the progress of high-speed traffic and mass transport, evil influences of vibrations and noises in various aspects have become a serious social problem. In some urban communities where many people reside in apartments, even domestic noises and vibrations in the neighboring homes are threatening the health of the residents. Therefore, now it is an important and urgent social demand to reduce the vibrations of machines, structures and so on and noises attributed thereto to thereby recover and maintain a tranquil and pleasant social environment.

Extensive researches on damping of mechanical vibrations have been made as well as researches on other methods for reduction or suppression of vibrations, and various kinds of vibration damping materials have been developed until now. In general these vibration damping materials are viscoelastic materials in which an organic polymeric material is used as the principal component, and in some cases organic polymer base composite materials are used. For damping of the vibration of a plate, for simplicity, a vibration damping material is brought into direct contact with a surface of the plate to form a coating layer of a suitable thickness. As is well known, the two basic types of vibration damping using a viscoelastic coating layer are the extensional type and the constrained shear type. In the case of the extensional type the outer surface of the coating layer of the viscoelastic damping material is left uncovered, but in the case of the constrained shear type a stiff constraining layer or plate is provided on the outer surface of the viscoelastic layer.

A vibration damping material for use in the extensional type damping is required to be large in the loss modulus, whereas a vibration damping material for use in the constrained type damping is required to be large in the dynamic loss factor. In either case it is also required that the loss modulus or the dynamic loss factor be sufficiently large over a wide temperature range and over a wide range of frequencies. As to the polymeric materials conventionally used for vibration damping, it is usual to utilize the glass transition region of each polymeric material since the loss modulus or the dynamic loss factor becomes largest in that region. To obtain a polymeric material having a relatively broad glass transition region, sometimes blending of two or more kinds of polymers which are miscible with each other or cross-linking copolymerization (or synthesis of interpenetrating polymer network) of nonmiscible polymeric materials is employed. In the cases of vibration damping materials for use in the extensional type damping, often an inorganic powdery, granular, flaky or fibrous filler is added to an organic polymer used as the matrix material to obtain a composite material that exhibits a relatively large loss modulus.

However, the conventional vibration damping materials are still unsatisfactory or disadvantageous in certain points. As to the conventional damping materials that utilize only an organic polymer, whether a single kind of polymer or a plurality of kinds of polymeric materials, the loss modulus or the dynamic loss factor of each damping material greatly and sharply decreases in a temperature range above the glass transition temperature or in a low frequency region. As to the conventional damping materials containing an inorganic filler with the intention of using in the extensional type vibration damping, the actual effect of the filler is not as high as expected. Besides, an increase in the loss modulus as the effect of the addition of an inorganic filler to an organic polymeric material is accompanied by a decrease in the dynamic loss factor, so that the damping materials of the composite type are of little use for vibration damping of the constrained type. From an industrial point of view, flexibility of the supply of the composite damping materials is marred by such restriction on the manner of use.

SUMMARY OF THE INVENTION

It is an object of the present invention to provide an improved vibration damping material, which is an organic polymer base material containing a filler but, nevertheless, is fully of use for vibration damping of either the extensional type or the constrained shear type and, furthermore, is higher in the loss modulus when used in the extensional manner and in the dynamic loss factor when used in the constrained manner than conventional damping materials of organic polymer base over a broader range of temperature and also in broader regions of frequencies.

A vibration damping material according to the invention is a composite material, which comprises an organic polymer as the matrix of the composite material and a flake filler dispersed in the polymer matrix. This composite material is primarily characterized in that the orientation of the flakes of the filler is controlled such that the major surfaces of the individual flakes are at an angle of 0° ±30° with a predetermined plane which intersects a mass of the vibration damping material.

The orientation of the aforementioned predetermined plane depends on whether the vibration damping material is used in the extensional manner or in the constrained manner. In the case of vibration damping of the extensional type the predetermined plane becomes parallel to the neutral plane which exists in the composite system including a layer of the vibration damping material when the system is in flexure vibration. In the accompanying drawings FIG. 3 shows a beam or plate which represents a vibration system including a damping layer. When the plate is subjected to a flexural load or vibration, a bending moment is produced as indicated by arrows F, so that a tensile stress $S_T$ in a direction generally parallel to the major surfaces of the plate is produced in one region of the plate while a compressive stress $S_C$ in the reverse direction is produced in the remaining region of the plate. At a plane $P_N$ as the interface between the two regions of the plate both the tensile stress $S_T$ and the compressive stress $S_C$ become zero. This plane $P_N$ is called the neutral plane. The neutral plane $P_N$ is usually parallel to the major surfaces of the plate and exists in the vicinity of the middle of the thickness of the plate if the plate is homogeneous.

FIG. 1 of the drawings illustrates vibration damping of the extensional type using a sheet 20A of a damping material according to the invention. The sheet 20A is formed of a polymer matrix 22 and flakes 24 used as filler. Numeral 10 indicates a substrate representing a structure of which the vibration is to be damped. In this case the aforementioned predetermined plane is parallel to the major surfaces of the sheet 20A, so that the major surfaces of each flake 24 are at an angle of 0° ±30° with the major surfaces of the sheet 20A. When the composite system of the substrate 10 and the damping layer 20A is in flexure vibration a neutral plane exists either in the substrate 10 or in the damping layer 20A. In this case it is of prime importance for realization of large values of loss modulus over wide ranges of temperature and frequency that the deviations of the orientation of the individual flakes 24 from the standard angle of 0° be within the tolerance of ±30°. Otherwise, the loss modulus of the vibration damping material 20A becomes smaller over the entire range of temperature and in every region of frequencies, and particularly significantly. at temperatures above the glass transition region or in a low frequency region, so that the effect of the flaky filler 24 on the vibration damping performance becomes very small. Besides, when the orientation of the flakes 24 is inaccurate the loss modulus of the vibration damping material might become smaller than that of the polymer of the matrix 22 in a certain range of temperature below the glass transition temperature or in a high frequency region. It is preferred that the deviations of the orientation of the individual flakes 24 from the standard angle of 0° be within ±15°.

FIG. 2 illustrates vibration damping of the constrained shear type using a sheet 20B of a damping material according to the invention. Indicated at 30 is a constraining layer. In this case the aforementioned predetermined plane is normal to the major surfaces of the sheet 20B, so that the major surfaces of each flake 24 are at an angle of 90° ±30° with the major surfaces of the sheet 20B and, hence, with a neutral plane in the illustrated three-layer system. In this case it is of prime importance for realization of improved values of dynamic loss factor that the deviation of the orientation of the individual flakes 24 from the standard angle be within the tolerance of ±30°. Otherwise, the dynamic loss factor will decrease at temperatures below the glass transition region or in a high frequency region, and it becomes impossible to fully gain the merits of using a flaky filler in respect of the dynamic loss factor of the vibration damping material, as will later be demonstrated in an example of the invention. Also in this case it is preferred that the deviations of the orientation of the individual flakes from the standard angle of 0° (or 90° with the neutral plane) be within the range of ±15°.

It is a surprising advantage of the present invention that not only the loss modulus but also the dynamic loss factor is increased by adding a filler to an organic polymer. As mentioned hereinbefore, according to the commonplace knowledge it was impossible to suppose that the efficiency of vibration damping of the constrained type could be improved by using a polymer base composite material containing an inorganic filler. Furthermore, a damping material of the invention is higher also in the loss modulus than conventional vibration damping materials of the composite type in any region of temperature or frequency. As an additional advantage of the invention, the new vibration damping material formed into the shape of a block can be cut into either sheets for use in vibration damping of the extensional type or sheets of different directionality for use in vibration damping of the constrained shear type.

A vibration damping material of the invention is effectively applicable to various machines, vehicles, buildings, bridges, other structures, pipes, ducts and so on. The surfaces with which the vibration damping material is brought into contact may be of metal, concrete, wood, refractory or fiber-reinforced plastics by way of example.

The material of the invention is superior in vibration damping performance as explained hereinbefore and, therefore, makes a great contribution to the reduction of noises in various fields. Besides, by the application of this damping material it is possible to prevent the rupture of structural metal members by fatigue attributed to vibrations. Accordingly there is a good prospect of the application of this vibration damping material to the airframe of aircraft or the casing of rockets as a damping layer in a sandwich structure.

BRIEF DESCRIPTION OF THE DRAWINGS

FIG. 1 explanatorily shows a vibration damping system of the extensional type using a vibration damping material according to the invention in a perspective view;

FIG. 2 explanatorily shows a vibration damping system of the constrained shear type using a vibration damping material according to the invention in a perspective view;

FIG. 3 is an explanatory illustration of a model system vibrating in flexure to show a neutral plane in the vibrating system;

FIG. 4 is a schematic and perspective view of a film of a composite material as an intermediate of a vibration damping material according to the invention;

FIG. 5 is a schematic and perspective view of a block produced by laminating and compressing a number of films of FIG. 4;

FIG. 6(A) is a schematic and perspective view of a sheet cut out of the block of FIG. 5, the sheet serving as a vibration damping material of the invention for use in the extensional manner;

FIG. 6(B) is a schematic and perspective view of another sheet cut out of the block of FIG. 5, the sheet serving as a vibration damping material of the invention for use in the constrained manner;

DESCRIPTION OF THE PREFERRED EMBODIMENTS

Figure 7:
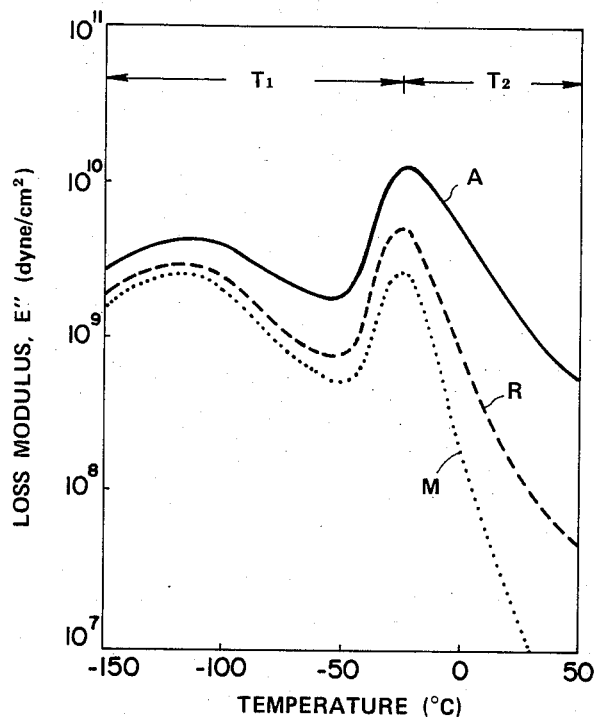
FIG. 7 is a graph showing the temperature dependence of the loss modulus of an exemplary vibration damping material of the invention for use in the extensional manner in comparison with samples of vibration damping materials not in accordance with the invention.

For the polymer matrix of a vibration damping material according to the invention, an almost free selection can be made from widely used various polymeric materials including rubbers, elastomers, thermoplastic resins and thermosetting resins. For example, butyl rubber, chloroprene rubber, butadiene rubber, nitrile rubber, isoprene rubber, urethane rubber, ethylene-propylene rubber and styrene-butadiene rubber can be named as useful synthetic rubbers besides natural rubber. Other than such rubbers, a suitable elastomer can be selected from polystyrene base elastomers, polyolefin base elastomers, polyurethane base elastomers and polyester base elastomers for example. As to thermoplastic resins, nylon, polycarbonate, polyesters, polyethylene, polypropylene, polystyrene, polyvinyl chloride, polymethyl methacrylate and polyurethane can be named as typical examples, and asphalt is also of use. Examples of useful thermosetting resins are epoxy resin, polyester resin, melamine resin, phenolic resin, polyethylene resin, urea resin and diallyl phthalate resin.

It is optional whether to use a single kind of polymeric material for the polymer matrix or to use a blend of two or more kinds of polymeric materials to produce a multi-component polymer matrix. In every case it is optional to incorporate a commonly used additive or additives such as plasticizer, modifier such as adhesive property improver and/or coloring agent into the selected polymeric material.

Various kinds of inorganic flakes currently available as commercial products are useful as the flake filler in a composite material according to the invention. Typical examples are glass flakes, aluminum flakes, stainless steel flakes, ferrite flakes such as barium ferrite flakes, montmorillonite, natural mica, synthetic mica, graphite, molybdenum disulfide, graphite fluoride, clay and talc. With a view to strengthening the adhesion between the polymer matrix and the flakes employed as filler, in some cases the flakes may precedingly be subjected to a surface treatment with, for example, a coupling agent. It is also possible to use inorganic flakes which are coated with an organic polymer.

Some of the above named flaky filler materials, such as montmorillonite and so-called tetrasilicic mica which belongs to synthetic fluorine mica, undergo swelling in certain liquids. Therefore, it is possible to obtain an inorganic film called "AlSi-film" by the steps of allowing such flakes to swell in a polar solvent to give a sol, applying the sol onto a flat plate by a flow-coating method and drying the resultant coating film. This inorganic film can be used as the flake filler in the present invention either in the form of film or in a suitably crushed form. In the cases of flaky filler materials having a layer lattice structure such as montmorillonite, mica and graphite, it is permissible that different species of molecules, atoms or ions are occluded between the crystal layers of the flaky materials.

It is also possible to use an organic flake filler on condition that the modulus of elasticity of the organic filler material is higher than that of the polymer employed as the matrix material. For example, flakes of various synthetic resins such as polyesters, nylon, polycarbonate, polyethylene, polypropylene and acrylic resins will be of use. At present, however, suitable flakes of such resins are hardly available on the commercial base. Besides, there is a possibility of using a natural organic flaky filler material such as rice chaff in a suitably crushed form.

The combination of a polymeric matrix material and a flake filler can variously be chosen with consideration of several factors such as the vibration damping performance and other properties required to the composite material and environmental conditions under which the vibration damping systems are to be used. In case of need it is permissible to use an inorganic granular or fibrous filler jointly with a flake filler.

The term flake in the present application should be taken in the usual sense. That is, there is no strict limitation to the shape and size of the flakes used in the present invention. The shape of the flakes may be generally circular or generally polygonal and, for example, the diameter of the flakes (or an equivalent dimension such as an average diagonal in the case of polygonal flakes) may be as small as 1 $\mu$m or as large as 10 mm and the thickness may be as small as 20 nm or as large as 1 mm. Usually it is suitable to use flakes having an average diameter of 20 to 1000 $\mu$m and thickness of 1 to 100 $\mu$m.

It is desirable that the aspect ratio (the ratio of the diameter or an equivalent to the thickness) of the flakes is at least 10, and preferably above about 25. Flakes of which the aspect ratio is smaller than 10 are relatively low in the reinforcing effect, and the vibration damping materials produced by using such flakes are relatively small in the degree of increase of the loss modulus when used in the extensional manner and relatively small in the degree of increase of the dynamic loss factor when used in the constrained manner. Besides, flakes of such a small aspect ratio are difficult to uniformly disperse in the polymer matrix by reason of a tendency to agglomerate and, moreover, offers difficulty in controlling the orientation of the flakes in the manner as specified in the present invention.

Also it is desirable that the content of inorganic flake filler in the composite material according to the invention is 3 to 60% by volume, and preferably about 5% to about 50% by volume. When the flake filler content is less than 3% by volume the reinforcing effect expected of the filler remains small, and the degree of increase in the loss modulus or in the dynamic loss factor of the composite material is relatively small. On the other hand, an increase of the filler content beyond 60% by volume is liable to result in a significant increase in the void volume in the composite material, and also in overlapping of a considerable portion of the individual flakes with one another with little intrusion of the polymeric material of the matrix between the adjacent flakes, and due to such defects the composite material becomes so deteriorated in its vibration damping characteristics and mechanical strength as cannot be neglected in some cases. A practicable maximal content of an inorganic flake filler depends somewhat on the material and diameter of the flakes. In the cases of glass flakes for example, the filler content can be made up to about 50% by volume when the diameter of the flakes is 45–90 $\mu$m and up to about 55% by volume when the diameter is 250–300 $\mu$m. The coating of inorganic flakes with an organic polymer has the effect of improving the miscibility of the flakes with the polymeric material of the matrix. Therefore, when the coated flakes are used a practicable range of the content of the flakes in the composite material can be broadened to 3–90% by volume (considering the volume of the inorganic flaky material itself) without offering difficulty to the control of the orientation of the flakes insofar as the aspect ratio of the flakes is at least 10, and in this case it is preferable that the content of the flakes falls in the range from about 15% to about 85% by volume.

In a composite material according to the invention, it is favorable that internal stress typified by thermal stress remains at the interface between the polymer of the matrix and the individual flakes contained as filler. In the presence of such internal stress the molecular chain of the polymer existing at the interface remains in a stretched state and, hence, provides a structural difference from the bulk of the polymer. The stressed or bound polymer molecules at the interface are dissimilar in structure when considered in the direction parallel to the major surfaces of the oriented flakes and in the direction normal to the flake surfaces. For this reason the retention of the internal stress produces a favorable effect on the vibration damping performance of the composite material. Since shaping of the composite material is usually performed by molding at an elevated temperature, it is possible to retain thermal stress at the aforementioned interface by rapidly cooling the hot-shaped composite material.

A preferred method of producing a composite material or vibration damping material according to the invention in the form of either a sheet or a block with success in controlling the orientation of the flakes is a two-stage shaping method, in which the first stage is forming of a film of a composite material consisting essentially of a polymeric matrix material and a flake filler and the second stage is laminating and integrating of a number of films obtained at the first stage to form either a sheet of a suitable thickness or a block.

At the first stage the flakes can be oriented such that the major surfaces of every flake becomes parallel to the major surfaces of the film of the composite material by making the thickness of the film equivalent to or smaller than the diameter (or an equivalent dimension in the cases of noncircular flakes) of the flakes. A composite material to be formed into such a film is prepared usually by kneading a blend of a polymeric material employed as the matrix material and a selected flake filler at a suitably elevated temperature. The kneaded composition can be formed into a film by using a conventional polymer shaping method such as extrusion, press-forming, injection molding, calendering or solution processing such as flow-coating, or a combination of two kinds of methods such as the combination of flow-coating as the first step and press-forming as the second step. During the film forming process the flakes may brake to different degrees depending on the kind and grade of the polymeric matrix material and also on the type of the forming method. Accordingly it is important to employ a suitable forming method with consideration of the viscosity of the kneaded composition, a desired flake diameter in the product and so on. FIG. 4 shows a film 50 of the composite material, which consists of polymer matrix 22 and flakes 24 used as filler, formed in the above described way.

At the second stage, a number of films 50 are placed one upon another and integrated into a suitably thick sheet or a block 60 as shown in FIG. 5. Various methods are useful for laminating and integrating the films 50. For example, when a thermosetting resin is employed as the polymeric matrix material and the films 50 of the composite material are supplied in cured state, the integration can be accomplished by using an adhesive. When a thermoplastic polymer is employed as the matrix material, the films 50 once solidified may be integrated by hot press-forming or in some cases by using a suitable organic solvent which dissolves the film surfaces and afford an adhesive property to the films 50.

It will be understood that during the process of integrating the films 50 into the block 60 the orientation of the flakes 24 in the composite material does not change. That is, the major surfaces of the flakes 24 in the block 60 are parallel to the upper surface of the block 60.

Referring to FIG. 6(A), a suitably thick sheet 20A of the composite material, which is useful as a vibration damping material of the extensional type as illustrated in FIG. 1, can be cut out of the block 60 of FIG. 5 in the direction parallel to the upper and lower surfaces of the block 60. Where the block 60 is relatively small in thickness, the entirety of the block 60 may be used as a sheet of a vibration damping material of the extensional type. Referring to FIG. 6(B), another sheet 20B of the composite material in which the flakes 24 are oriented normal to the major surfaces of the sheet 20B can be cut out of the same block 60 in the vertical direction. This sheet 20B is useful as a vibration damping material in a system of the constrained shear type as illustrated in FIG. 2.

A block of a composite material according to the invention analogous to the block 60 of FIG. 6 can be formed by a different method. First a heap of flakes employed as filler is produced. This is achieved by floating the flakes in either air or a suitable liquid and allowing the flakes to slowly fall down until completion of sedimentation. By this technique it is possible to heap the flakes with satisfactorily good orientation so that the flakes in the heap lie generally horizontally. Next, a liquid polymeric material sufficiently low in viscosity is slowly impregnated into the heap with adequate pressurization, and the impregnated polymer is cured to thereby complete the forming of the block of the composite material. To successfully accomplish the impregnation of the polymer into the heap of the flakes, it is of prime importance that the viscosity of the liquid polymer be very low. As a modification of this method, a liquid monomer of a polymerizable material may be impregnated into the heap of the flakes and subsequently caused to polymerize and cure. As a further modification, it is possible to produce a heap of flakes impregnated with a polymerizable monomer by floating the flakes in a liquid monomer to slowly fall down until completion of sedimentation and then discharging the excess portion of the liquid monomer. Also in this case the liquid monomer in the heap of the flakes is subsequently caused to polymerize and cure.

Usually a vibration damping material according to the invention is shaped into the form of sheet or tape prior to the application to the objects of vibration damping. However, in some cases it is possible to form an extensional type vibration damping material according to the invention directly on the surface of a vibratory structural member by applying a slurry composed of a polymeric matrix material and a flake filler onto that surface by, for example, brushing or spraying and then curing or solidifying the polymeric material in the applied slurry.

In vibration damping of the constrained shear type using the present invention, the constraining layer 30 in FIG. 2 does not differ from ones used in combination with conventional vibration damping materials. That is, the material of the constraining layer can be selected from a wide variety of relatively hard materials such as metals including alloys, fiber-reinforced plastics, glass fiber-reinforced concrete, flexible plastic boards, asbestos boards, wood and plywood. Even an organic polymer base composite material can be used if the modulus of elasticity of such a material is fairly higher than that of the vibration damping material beneath the constraining layer.

EXAMPLE 1

A thermoplastic polyurethane elastomer (abbreviated to PUR) was used as the polymeric matrix material and glass flakes (abbreviated to GFL) as the flake filler. The glass flakes had a weight average diameter of about 230 $\mu$m and thickness of about 2.5 $\mu$m, so that the aspect ratio was calculated to be 92.

The PUR in powder form was preliminarily dried at 80° C. for 2 hr, and 10 parts by weight of the dried PUR was dissolved in 70 parts by weight of dimethylformamide (DMF). A predetermined amount of GFL was added to the PUR solution, and the resultant mixture was kneaded to obtain an adequately viscous slurry. After degasification the slurry was applied by a flow-coating method onto a plate-shaped substrate having a flat and smooth surface to form a thin coating layer, which was dried at 80° C. for 5 hr. In the dried coating film the glass flakes oriented generally parallel to the plane of the film. After the drying the coating film was detached from the substrate and further dried by reduced pressure drying. Next, in a hot press the film was preheated for 10 min at 180° C. and then uniformly compressed at the same temperature by application of a pressure of about 50 kg/cm$^2$ to obtain an about 150 $\mu$m thick film of the composite material consisting of PUR and GFL. Since the thickness of this film was made smaller than the diameters of the individual glass flakes, the whole flakes were oriented parallel to the major surfaces of the film. That is, this film was of the same structure as the illustration in FIG. 4, wherein numeral 50 indicates the film of the composite material consisting of a polymer matrix 22 (in this case PUR) and flakes 24 employed as filler (in this case GFL). A number of the same films 50 were produced by the same process.

These films 50 were placed one upon another to give a provisional laminate. In a hot press the provisional laminate was preheated for 10 min at 180° C. and then compressed at the same temperature for 3 min. In this case the compression pressure did not exceed 5 kg/cm$^2$. As the result the provisional laminate of the films 50 turned into an integral block 60 as illustrated in FIG. 5. Keeping the block 60 under the compression pressure, the block 60 was rapidly cooled from 180° C. down to 30° C. at an average cooling rate of 12° C./min by passing cooling water through conduits in the metal die. After that the block 60 was taken out of the metal die, and the same block 60 was again subjected to the above described process of prehating, pressing and rapid cooling. In the thus produced block 60 of the composite material, the glass flakes 24 had been oriented parallel to the upper and lower surfaces of the block 60, i.e. normal to the direction of lamination of the initial films 50 and, hence, to the direction of the compression force applied to the laminate.

Referring to FIG. 6(A) together with FIG. 5, a sheet 20A was cut out of the block 60 such that the glass flakes 24 in this sheet 20A oriented parallel to the major surfaces of the sheet 20A. Referring to FIGS. 5 and 6(B), another sheet 20B was cut out of the same block 60 such that the glass flakes 24 in this sheet 20B oriented normal to the major surfaces of the sheet 20B. By observation with scanning electromicroscope, it was confirmed that in either of the sheet 20A of FIG. 6(A) and the sheet 20B of FIG. 6(B) the deviations of the orientation of the individual glass flakes 24 in the sheet were within ±15 degrees from the standard direction. In the block 60 of the composite material and, hence, in either of the two types of sheet 20A and 20B, the content of the glass flakes 24 was approximately 32% by volume.

The sheet 20A of FIG. 6(A) was for use as a vibration damping material of the extensional type and the sheet 20B of FIG. 6(B) as a vibration damping material of the constrained shear type. The vibration damping characteristics of the respective sheets 20A and 20B were measured in comparison with two kinds of known vibration damping materials described below as Reference 1.

REFERENCE 1

A predetermined amount of GFL used in Example 1 was added to the powdery PUR used in Example 1 (preliminarily dried at 80° C. for 2 hr), followed by dry mixing. The mixture was put into a metal die and preheated in a hot press for 10 min at 180° C. and then compressed at the same temperature by applying a pressure of about 50 kg/cm$^2$ for 3 min to form a block of the composite material. Keeping the block under the compression pressure, the block was rapidly cooled from 180° C. to 30° C. at an average cooling rate of 12° C./min by passing cooling water through conduits in the metal die. After that the block was taken out of the die. In this case the hot-pressing procedure was not repeated. In the thus produced block the content of the glass flakes was approximately 32% by volume (the same as in Example 1), but the individual flakes oriented wholly at random. Several sheets were cut out of this block in various directions and subjected to observation with scanning electronmicroscope. It was confirmed that in every sheet the individual glass flakes oriented at random without the indication of any particular directionality with respect to the plane of a major surface of the sheet. These sheets will be referred to as vibration damping material R.

Besides, a sheet of PUR was formed without adding any filler thereto. The PUR sheet will be referred to as vibration damping material M.

On the composite material sheet 20A of FIG. 6(A) produced in Example 1, and also on the composite material sheet R and the PUR sheet M of Reference 1, measurements of the loss modulus were carried out at varous temperatures by using a dynamic viscoelastometer of the nonresonant forced extension type, postulating that these sheets were for use in vibration damping of the extensional type. The results are shown in FIGS. 7 and 8, wherein the symbol A represents the composite material sheet 20A of Example 1 and the symbols R and M respectively represent the two kinds of sample sheets of Reference 1.

Figure 8:
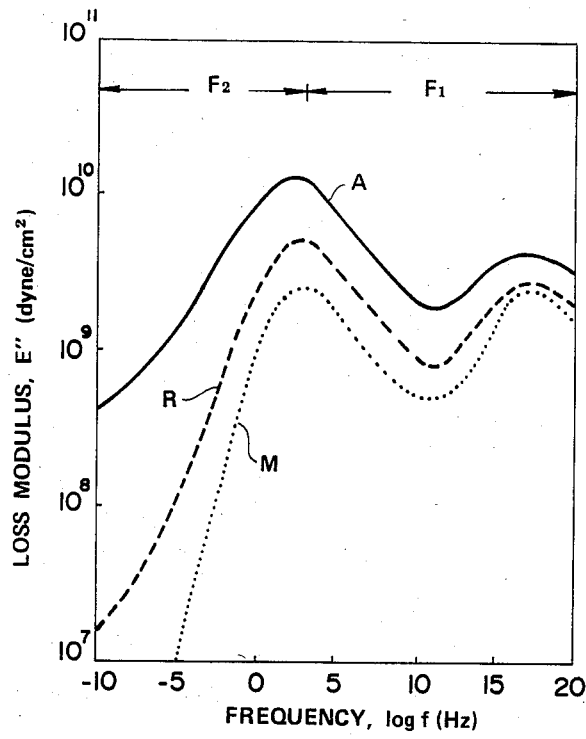
FIG. 8 is a graph showing the frequency dependence of the loss modulus of the same materials as in FIG. 7.

FIG. 7 shows the dependence of the loss modulus of each sample on the temperature when measured at a frequency of 110 Hz. The indicated two ranges $T_1$ and $T_2$ of the temperature are respectively below and above the glass transition temperature of the PUR used as the polymeric matrix material. FIG. 8 shows the dependence of the loss modulus of each sample on the frequency. The curves in FIG. 8 are synthesized curves (called "master curves") drawn by superposing many data obtained under different time-temperature conditions. A standard temperature was −25° C. In FIG. 8 the entire range of the frequency is divided into a relatively high frequency region $F_1$ and a relatively low frequency region $F_2$.

In the case of the PUR sheet M containing no filler, the loss modulus greatly and sharply decreases in either the high temperature region $T_2$ or the low frequency region $F_2$. As is known, this tendency is not specific to PUR but is common to polymeric materials conventionally used in vibration dampers of the extensional type, and this is the most serious disadvantage of singly using a polymeric material, without the addition of any filler, as a vibration damper of the extensional type. Although it is possible to obtain a polymeric material with a widened glass transition region by blending or copolymerizing two or more kinds of polymeric materials, it is impossible to obviate or greatly reduce the mentioned disadvantage solely by the blending or copolymerizing technique. With a view to producing a further improvement in this respect it is a common practice to add an inorganic filler to a polymeric material for the vibration damping purpose, and in general a flaky filler is more effective than a powdery or fibrous filler. In FIGS. 7 and 8, it is apparent that the composite material R of Reference 1 containing the glass flakes in random orientation is higher in the loss modulus than the single-component polymeric material M over the entire range of the temperature and also in every region of the frequency. However, the improved characteristics of the sample R are still unsatisfactory from a practical point of view. In contrast, the sheet 20A produced in Example 1 by using the same polymer and flake filler but by controlling the orientation of the flakes in the hereinbefore described manner is remarkably higher in the loss modulus in every region of the temperature and also in every region of the frequency. Furthermore, it is characteristic of this sheet 20A that the loss modulus greatly increases particularly in the high temperature region $T_2$ in FIG. 7 and in the low frequency region $F_2$ in FIG. 8.

Figure 9:
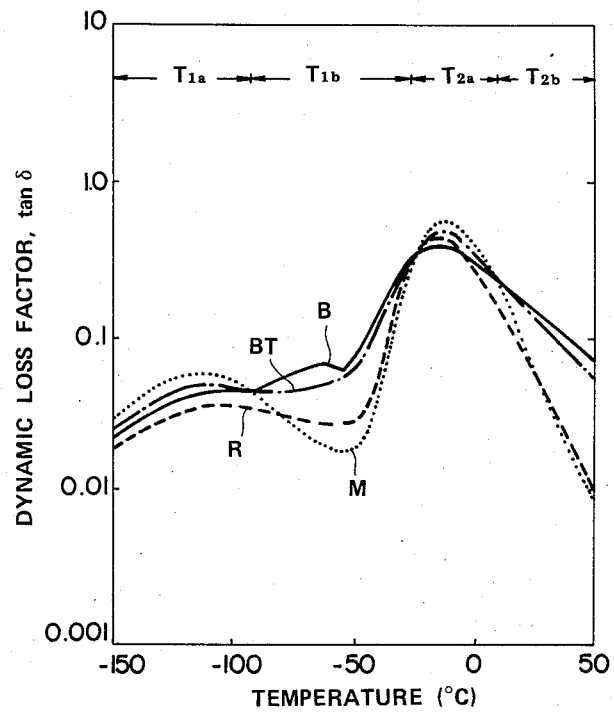
FIG. 9 is a graph showing the temperature dependence of the dynamic loss factor of an exemplary vibration damping material of the invention in comparison with samples of vibration damping materials not in accordance with the invention.
Figure 10:
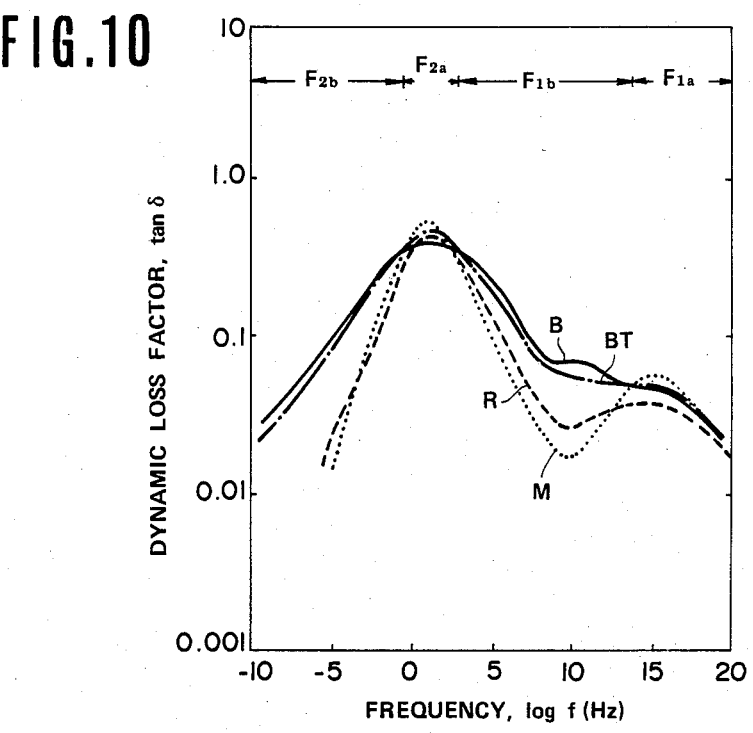
FIG. 10 is a graph showing the frequency dependence of the dynamic loss factor of the same materials as in FIG. 9.

On the composite material sheet 20B of FIG. 6(B) produced in Example 1, and also on the two kinds of samples M and R of Reference 1, measurements of the dynamic loss factor or loss tangent tan δ were also carried out by using the aforementioned dynamic viscoelastometer, postulating that these sheets were for use in vibration damping of the constrained shear type. The results are shown in FIGS. 9 and 10, wherein the symbol B represents the sheet 20B of Example 1 and the symbols M and R respectively represent the two kinds of samples of Reference 1. The symbol BT represents another composite material sheet according to the invention, which was obtained by subjecting the sheet 20B produced in Example 1 to an annealing heat treatment of 100° C.×3 hr for the purpose of releasing the thermal stress remained at the interfaces between the individual flakes and the polymer matrix. FIG. 9 shows the dependence of the dynamic loss factor on the temperature when measured at 110 Hz. The low temperature region $T_1$ in FIG. 7 is further divided into two regions $T_{1a}$ and $T_{1b}$, and the high temperature region $T_2$ in FIG. 7 into two regions $T_{2a}$ and $T_{2b}$. FIG. 10 shows the dependence of the dynamic loss factor on the frequency. These curves are synthesized in the same way as in FIG. 8. The high frequency region $F_1$ in FIG. 8 is further divided into two regions $F_{1a}$ and $F_{1b}$, and the low frequency region $F_2$ into two regions $F_{2a}$ and $F_{2b}$.

In the case of the PUR sheet M containing no filler, the dynamic loss factor was very small except in the specific region $T_{2a}$ of temperature or in the specific region $F_{2a}$ of frequency. As is known, this tendency is common to polymeric materials conventionally used for vibration damping purposes, and this is a serious disadvantage of singly using a polymeric material as the viscoelastic layer of a vibration damper of the constrained type. Although blending or copolymerization of two or more kinds of polymeric materials is effective for reducing this disadvantage to some extent, the effect is far from satisfaction from a practical point of view. The addition of an inorganic filler to a polymeric material as in the case of the sample R of Reference 1 generally has the effect of somewhat broadening the peak of the dynamic loss factor, but, as is well known, the broadening of the peak is accompanied by a significant lowering of the maximal value of the loss factor. Therefore, polymeric materials containing an inorganic filler have been regarded as unsuitable for vibration dampers of the constrained type.

In contrast, the sheet 20B produced in Example 1 by controlling the orientation of the flakes used as filler in the hereinbefore described manner becomes remarkably greater in the dynamic loss factor particularly in the high temperature region $T_{2b}$ in FIG. 9 and the low frequency region $F_{2b}$ in FIG. 10. Furthermore, it should especially be noted that in the case of the sheet 20B according to the invention a maximal peak of the dynamic loss factor appears in either the medium low temperature region $T_{1b}$ in FIG. 9 or the medium high frequency region $F_{1b}$ in FIG. 10, whereas in the case of the sample M containing no filler the dynamic loss factor takes a minimal value in the same temperature or frequency region. The importance of controlling the orientation of the flakes used as filler is understandable from the fact that the sample R containing the same flakes in random orientation scarcely exhibits such advantages as the sample 20B possesses. As will be understood from these demonstrative experimental results, the composite material according to the invention for use in vibration damping of the constrained type exhibits a considerable increase of the dynamic loss factor over a wide temperature range and also over a wide frequency range.

From a comparison between the curves B and BT in either FIG. 9 or FIG. 10, it is understood that the annealing of the vibration damping material according to the invention results in a slight decrease of the dynamic loss factor. Therefore, it is preferable to leave the thermal stress in the material at the interfaces between the individual flakes and the polymer matrix unreleased except when it is presumed that the retention of the stress will offer a certain problem to the application of the vibration damping material.

EXAMPLE 2

Using the same PUR and GFL as in Example 1 but by varying the amount of GFL, five kinds of composite materials according to the invention in the form of the block 60 shown in FIG. 5 were produced generally by the process described in Example 1. The contents of GFL (the flakes were about 230 μm in average diameter, about 2.5 μm in thickness and 92 in aspect ratio) in the respective blocks 60 were as shown in the following Table 1. The sheet 20A of FIG. 6(A) was cut out of each block 60 and subjected to the measurement of the loss modulus E″ at 20° C., 110 Hz to evaluate the vibration damping performance of the composite material when used in the extensional manner. The obtained data are shown in Table 1 together with the corresponding data on the samples of the following Reference 2.

REFERENCE 2

Using the same materials as in Example 2 and the process of producing the composite material R of Reference 1, five kinds of sheet-formed composite materials different in the content of GFL were produced (without controlling the orientation of the glass flakes) such that the contents of GFL in the respective samples became as shown in Table 1. On these samples the loss modulus E" was measured as mentioned in Example 2.

TABLE 1

| Samples of Ex. 2 | Content of Flakes (Vol %) | E" (dyne/cm$^2$) | Samples of Ref. 2 | Content of Flakes (Vol %) | E" (dyne/cm$^2$) |
|---|---|---|---|---|---|
| No. 1 | 43 | 3.4 × 10$^9$ | No. 1 | 43 | 1.1 × 10$^9$ |
| No. 2 | 26 | 1.2 × 10$^9$ | No. 2 | 26 | 3.5 × 10$^8$ |
| No. 3 | 19 | 5.6 × 10$^8$ | No. 3 | 19 | 2.0 × 10$^8$ |
| No. 4 | 12 | 2.7 × 10$^8$ | No. 4 | 12 | 1.2 × 10$^8$ |
| No. 5 | 6 | 8.0 × 10$^7$ | No. 5 | 6 | 3.8 × 10$^7$ |
|  |  |  | M of Ref. 1 | 0 | 2.6 × 10$^7$ |

Besides, samples of the sheet 2B of FIG. 6(B) were cut out of selected two of the blocks 60 produced in Example 2. On these samples and the corresponding samples of Reference 2 the dynamic loss factor tan δ was measured at 30° C., 110 Hz to evaluate the vibration damping performance of the sampled composite materials when used in the constrained manner. The results are shown in Table 2.

TABLE 2

| Samples of Ex. 2 | Content of Flakes (Vol %) | tan δ (dyne/cm$^2$) | Samples of Ref. 2 | Content of Flakes (Vol %) | tan δ (dyne/cm$^2$) |
|---|---|---|---|---|---|
| No. 1(B) | 43 | 0.10 | No. 1 | 43 | 0.045 |
| No. 4(B) | 12 | 0.078 | No. 4 | 12 | 0.040 |
|  |  |  | M of Ref. 1 | 0 | 0.035 |

EXAMPLE 3

In place of the GFL used in Examples 1 and 2, two kinds of glass flakes different in aspect ratio were used in this example. The glass flakes greater in aspect ratio had a weight average diameter of about 640 μm and thickness of 2.5 μm, so that the aspect ratio was calculated to be 260. The other glass flakes had a weight average diameter of about 68 μm and thickness of about 2.5 μm so that the aspect ratio was 27. The material of the polymer matrix was the PUR used in Examples 1 and 2.

Generally in accordance with Example 2, several kinds of composite materials according to the invention in the form of the block 60 were produced. On the sheets 20A of FIG. 6(A) cut out of the respective blocks 60 and the sheets 20B of FIG. 6(B) cut out of selected two of the blocks 60, and also on the corresponding samples produced in the below-described Reference 3, the measurements described in Example 2 were carried out under the same conditions. The results are shown in Tables 3A and 3B.

REFERENCE 3

Using the same materials as in Example 2 and the same process as in References 1 and 2, eight kinds of sheet-formed composite materials as shown in Table 3A were produced and tested as mentioned in Example 3.

TABLE 3A

| Samples of Ex. 3 | Glass Flakes Aspect Ratio | Glass Flakes Content (Vol %) | E" (dyne/cm$^2$) | Samples of Ref. 3 | Glass Flakes Aspect Ratio | Glass Flakes Content (Vol %) | E" (dyne/cm$^2$) |
|---|---|---|---|---|---|---|---|
| No. 1 | 260 | 44 | 7.0 × 10$^9$ | No. 1 | 260 | 44 | 3.6 × 10$^9$ |
| No. 2 | 260 | 26 | 3.5 × 10$^9$ | No. 2 | 260 | 26 | 1.8 × 10$^9$ |
| No. 3 | 260 | 19 | 2.1 × 10$^9$ | No. 3 | 260 | 19 | 9.2 × 10$^8$ |
| No. 4 | 260 | 12 | 1.0 × 10$^9$ | No. 4 | 260 | 12 | 5.0 × 10$^8$ |
| No. 5 | 260 | 6 | 3.6 × 10$^8$ | No. 5 | 260 | 6 | 1.4 × 10$^8$ |
| No. 6 | 27 | 43 | 3.9 × 10$^8$ | No. 6 | 27 | 43 | 1.6 × 10$^8$ |
| No. 7 | 27 | 25 | 8.2 × 10$^7$ | No. 7 | 27 | 25 | 3.8 × 10$^7$ |
| No. 8 | 27 | 12 | 4.7 × 10$^7$ | No. 8 | 27 | 12 | 3.2 × 10$^7$ |

TABLE 3B

| Samples of Ex. 3 | Glass Flakes Aspect Ratio | Glass Flakes Content (Vol %) | tan δ | Samples of Ref. 3 | Glass Flakes Aspect Ratio | Glass Flakes Content (Vol %) | tan δ |
|---|---|---|---|---|---|---|---|
| No. 1(B) | 260 | 44 | 0.090 | No. 1 | 260 | 44 | 0.043 |
| No. 5(B) | 260 | 6 | 0.090 | No. 5 | 260 | 6 | 0.041 |

EXAMPLE 4

In place of the glass flakes used in the foregoing examples, flaky natural mica was used in this example. The mica flakes had a weight average diameter of about 230 μm and thickness of about 3.0 μm, so that the aspect ratio was 77. In a part of this example, the mica flakes were coated with polymethyl methacrylate (PMMA) such that the proportion of mica to PMMA in the coated flakes became 90:10 by volume. The material of the polymer matrix was the PUR used in the foregoing examples.

The production of composite materials according to the invention and the testing of the composite materials in the form of the sheet 20A of FIG. 6(A) or the sheet 20B of FIG. 6(B) were carried out in accordance with Example 2. The results are shown in Table 4 together with the data on the samples of the below-described Reference 4. In Table 4, the contents of the coated mica flakes refer to the contents of mica itself, excluding the PMMA coating.

REFERENCE 4

Using the same materials as in Example 4 and the same process as in Reference 1, sheet-formed composite materials as shown in Table 4 were produced without controlling the orientation of the mica flakes and tested as mentioned in Example 4.

TABLE 4

| Samples of Ex. 4 | Content of Mica Flakes (Vol %) | E" (dyne/cm²) | Samples of Ref. 4 | Content of Mica Flakes (Vol %) | E" (dyne/cm²) |
| --- | --- | --- | --- | --- | --- |
| No. 1 | 43 | $6.9 \times 10^9$ | No. 1 | 43 | $2.3 \times 10^9$ |
| No. 2 | 20 | $1.3 \times 10^9$ | No. 2 | 20 | $4.3 \times 10^8$ |
| No. 3 | 82 (coated) | $2.1 \times 10^9$ | No. 3 | 82 (coated) | $1.3 \times 10^9$ |
| No. 4 | 65 (coated) | $1.2 \times 10^9$ | No. 4 | 65 (coated) | $8.2 \times 10^8$ |

The measurement of the dynamic loss factor tan δ on the sample No. 1 of Example 4 in the form of the sheet 20B of FIG. 5(B) gave a value of 0.20, whereas tan δ of the sample No. 1 of Reference 4 was 0.072.

EXAMPLE 5

A blend of 100 parts by weight of a polyvinyl chloride resin, 30 parts by weight of dioctyl phthalate (plasticizer) and 26 parts by weight of nitrile rubber was used as the material of the polymer matrix. The glass flakes of large aspect ratio (260) used in Example 3 were added to the polymer blend, and a composite material according to the invention was produced by a two-stage forming process, wherein the first stage to form a thin film was performed by means of hot-rolls and the second stage to compress a laminate of the films by means of a hot-press. The content of the glass flakes in the product was 43% by volume.

The measurement of the loss modulus E" on a sample of this composite material in the form of the sheet 20A of FIG. 6(A) gave a value of $1.8 \times 10^{10}$ dyne/cm² at 20° C., 110 Hz. For comparison, a sheet-formed reference sample produced from the same materials so as to contain 43% by volume of the glass flakes but without controlling the orientation of the flakes gave an E" value of $8.1 \times 10^9$ dyne/cm². In the case of another referenc sample which was formed solely of the polymer blend, E" was $1.2 \times 10^9$ dyne/cm².

What is claimed is:

1. A vibration damping composite material for use in a vibration damping system of the constrained type, the composite material being in the form of a sheet and comprising:
   an organic polymer matrix; and
   a flake filler substantially uniformly dispersed in said polymer matrix and consisting of flake particles having a mean diameter in the range of from about 20 to about 1000 microns and each having a thickness in the range of from about 1 to about 100 microns and a diameter-to-thickness aspect ratio of at least about 10, said flake particles being substantially entirely oriented so as to each make a standard angle of 90°, with a tolerance of ±30°, with respect to a plane parallel to said sheet.

2. A virbration damping composite material according to claim 1, wherein said aspect ratio is above about 25.

3. A vibration damping composite material according to claim 1, wherein said flake filler comprises an inorganic material.

4. A vibration damping composite material according to claim 3, wherein the content of said flake filler in the composite material is from about 3% to about 60% by volume.

5. A vibration damping composite material according to claim 3, wherein said flake particles are coated with an organic polymer, and wherein the content of said inorganic material in the composite material being is from about 3% to about 90% by volume.

6. A vibration damping composite material according to claim 3, wherein said flake filler is selected from the group consisting of metal flakes, glass flakes, ferrite flakes, montmorillonite, mica, flaky graphite, flaky molybdenum disulfide, flaky graphite floride, flaky clay and flaky talc.

7. A vibration damping composite material according to claim 1, wherein the material of said organic polymer matrix is selected from the group consisting of rubbers, elastomers, thermoplastic resins and thermosetting resins.

8. A vibration-damping composite material according to claim 1, wherein said tolerance is about ±15°.

9. A vibration damping composite material for use in a vibration damping system of the extensional type, the composite material being in the form of a sheet and comprising:
   an organic polymer matrix; and
   a flake filler substantially uniformly dispersed in said polymer matrix and consisting of flake particles having a means diameter in the range of from about 20 to about 1000 microns and each having a thickness in the range of from about 1 to about 100 microns and a diameter-to-thickness aspect ratio of at least about 10, said flake particles being substantially entirely oriented so as to each make a standard angle of 0°, with a tolerance of ±30°, with respect to a plane parallel to said sheet.

10. A vibration damping composite material according to claim 9, wherein said aspect ratio is above about 25.

11. a vibration damping composite material according to claim 9, wherein said flake filler comprises an inorganic material.

12. A vibration damping composite material according to claim 9, wherein the content of said flake filler in the composite material is from about 3% to about 60% by volume.

13. A vibration damping composite material according to claim 9, wherein said flake particles are coated with an organic polymer, and wherein the content of said inorganic material in the composite material is from about 3% to about 90% by volume.

14. A vibration damping composite material according to claim 9, wherein said flake filler is selected from the group consisting of metal flakes, glass flakes, ferrite flakes, montmorillonite, mica, flaky graphite, flaky molybdenum disulfide, flaky graphite fluoride, flaky clay and flaky talc.

15. A vibration damping composite material according to claim 9, wherein the material of said organic polymer matrix is selected from the group consisting of rubbers, elastomers, thermoplastic resins and thermosetting resins.

* * * * *